United States Patent [19]

Honjo

[11] Patent Number: 4,685,147
[45] Date of Patent: Aug. 4, 1987

[54] OPTICAL READING AND DISPLAYING DEVICE

[75] Inventor: Yoshiaki Honjo, Tokyo, Japan

[73] Assignee: Casio Computer Co., Ltd., Tokyo, Japan

[21] Appl. No.: 598,888

[22] Filed: Apr. 10, 1984

[30] Foreign Application Priority Data

Apr. 15, 1983 [JP] Japan .................................. 58-65678

[51] Int. Cl.$^4$ ............................................ G06K 9/58
[52] U.S. Cl. ...................................... 382/66; 382/57; 250/566; 250/358; 235/462
[58] Field of Search ............... 235/462, 463, 470, 383, 235/385; 382/66, 65, 57; 250/566, 568; 350/358

[56] References Cited

U.S. PATENT DOCUMENTS

| | | | |
|---|---|---|---|
| 3,520,586 | 7/1970 | Bousky | 250/566 |
| 4,006,343 | 2/1977 | Izura et al. | 382/66 |
| 4,455,485 | 6/1984 | Hosaka et al. | 350/358 |
| 4,575,623 | 3/1986 | Cononi | 235/383 |
| 4,577,932 | 3/1986 | Gelbart | 350/358 |

OTHER PUBLICATIONS

"Pattern Optimization for UPC Supermarket Scanner", B. U. Braunecker, IBM J. Res. Develop, vol. 24, No. 1, 1/80, p. 89.

Primary Examiner—Leo H. Boudreau
Assistant Examiner—A. Anne Skinner
Attorney, Agent, or Firm—Pennie & Edmonds

[57] ABSTRACT

An optical reading device provided with an exclusive display section for displaying character patterns and the like in response to electrical signals applied from deflection control circuits. The deflection control circuits include a scanning pattern memory for storing those data which correspond to the scanning patterns of the deflected light, and a character pattern memory for storing those data which correspond to character patterns of the deflected light, wherein a character pattern is displayed in the display section according to a scanning pattern based on the recognition of data detected by a photoelectric converter.

15 Claims, 14 Drawing Figures

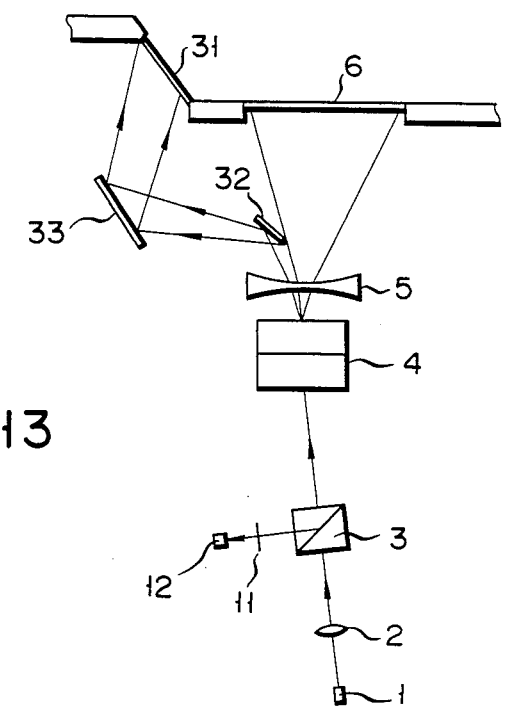
F I G. 13
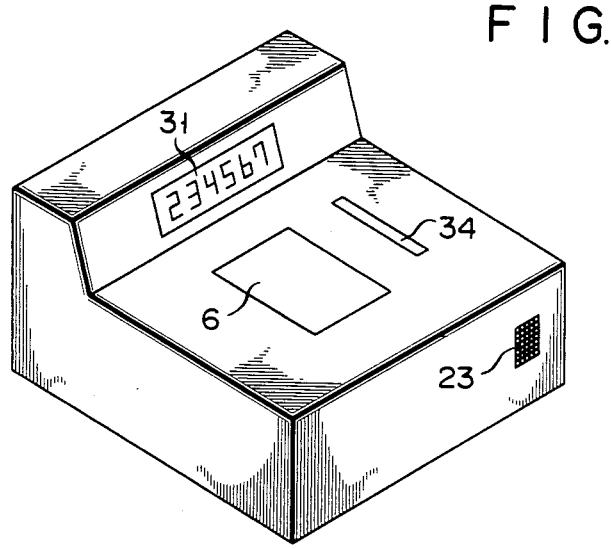
F I G. 14

OPTICAL READING AND DISPLAYING DEVICE

BACKGROUND OF THE INVENTION

The present invention relates to an optical reading device such as a zebra or bar code reader.

A zebra code reader of scanner type, which is installed at a fixed position, is known. This reader radiates light onto a recording medium (e.g., a label) with a zebra code representing the price of an article. The light reflected from a black bar is less intense than the light reflected from a white bar. This difference in light intensity is converted into an electrical signal. The zebra code reader supplies this signal to a data processing apparatus, e.g., an electronic cash register, which is connected to it. The display device of the data processing apparatus displays the data which has been read from the recording medium.

If the zebra code reader and the data processing apparatus are relatively remote from one another, a problem will arise. The cashier and customer, both standing close to the zebra code reader and at a distance from the data processing apparatus, may not correctly read the data displayed by the data processing apparatus. To avoid this error, the zebra reader may be equipped with a display device. In this case, however, the zebra code reader must be provided with several control circuits for driving this display device. This will make the reader very complex and costly.

SUMMARY OF THE INVENTION

Accordingly, the object of the present invention is to provide an optical reading device which has a display section and is yet relatively simple in structure and low in cost.

To achieve the object, an optical reading device of the invention comprises a light source for generating light; light-deflection means comprising at least two light-deflecting elements put one upon the other to deflect light from said light source; deflection control means for generating electrical signals that control the deflection of light by said deflection means so as to scan said light across an object to be scanned and to generate one or more characters; means for receiving light reflected from said object that is scanned and for recognizing data recorded on said object; and means for displaying the characters generated by deflection of said light by the deflection means. Advantageously, the receiving means is interconnected with the deflection means so as to generate a character display related to the data recorded on the object, for example, to display price or produce identification for an object to which a zebra or bar code label is attached.

BRIEF DESCRIPTION OF THE DRAWINGS

FIG. 13 shows the optical system of a further example of an optical reading device according to the present invention; and FIG. 14 is a perspective view showing a still further embodiment of the present invention in which a detection window is provided.

DETAILED DESCRIPTION OF THE PREFERRED EMBODIMENTS

Figure 1:
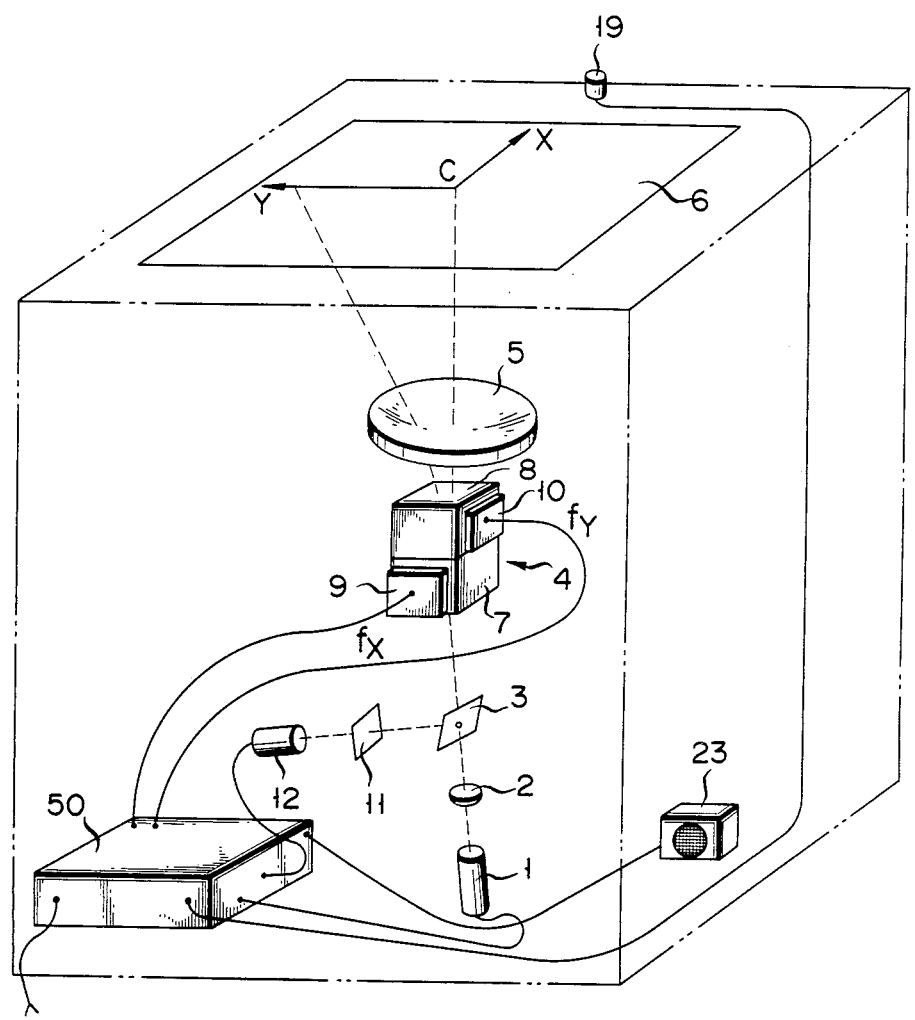
FIG. 1 schematically illustrates the optical system of an optical reading device according to the present invention.

A first embodiment of the present invention will be described in detail referring to FIGS. 1 through 6. The embodiment shows how the present invention is applied to a zebra code reader of the stationary scanner type having the optical system shown in FIG. 1. A laser beam emitted from a laser beam generator 1 enters a deflector 4 through a focusing lens 2 and an aperture mirror 3, and is deflected by the deflector 4 to irradiate the underside of a reading window 6, which is a semi-transparent plate, through a concave lens 5. The deflector 4 comprises beam-deflecting elements 7 and 8 which are put one upon the other. The beam-deflecting elements serve to deflect the beam through the aperture mirror 3, responsive to an electrical signal fx or fy. The beam-deflecting elements 7 and 8 use the monocrystal of tellurium dioxide ($TeO_2$) as a medium in this case. The lower beam-deflecting element 7 serves to deflect the incident laser beam in the horizontal direction, or in the direction x on the reading window 6 when the predetermined electrical signal fx is applied to a piezo-element 9 which is stuck to one side of the beam-deflecting element 7 in the beam-deflecting direction. The upper beam-deflecting element 8 serves to deflect the incident laser beam in the vertical direction or in the direction y on the reading window 6 when the predetermined electrical signal fy is applied to a piezo-element 10 which is stuck to one face of the beam-deflecting element 8 in the beam-deflecting direction. The electrical signals fx and fy serve to control the beam-deflecting angles of the beam-deflecting elements 7 and 8 according to their voltage values in this case, thereby forming predetermined scanning patterns for scanning bills or zebra coded media on the reading window 6, and thereby displaying predetermined character patterns such as letters, numerals or other symbols on the reading window 6.

The beam reflected when the bill or price tag on the reading window 6 is beam-irradiated is guided to the aperture mirror 3, after passing through the concave lens 5 and the deflector 4, and is reflected in a direction perpendicular to the incident laser beam. The reflected beam is then introduced to a photoelectric converter 12 through an interference filter 11 and is converted to an electrical signal. The interference filter 11 allows the laser beam to pass therethrough, but blocks any disturbance from fluorescent light or sunlight.

The deflector 4 is connected to a circuit 50 which will be described later, which receives the electrical signals fx and fy. A position detector 19 is arranged adjacent to the reading window 6 to detect objects which cross it. Detector 19 is also connected to the circuit 50 together with a speaker 23, the laser beam generator 1 and the photoelectric converter 12.

Figure 2:
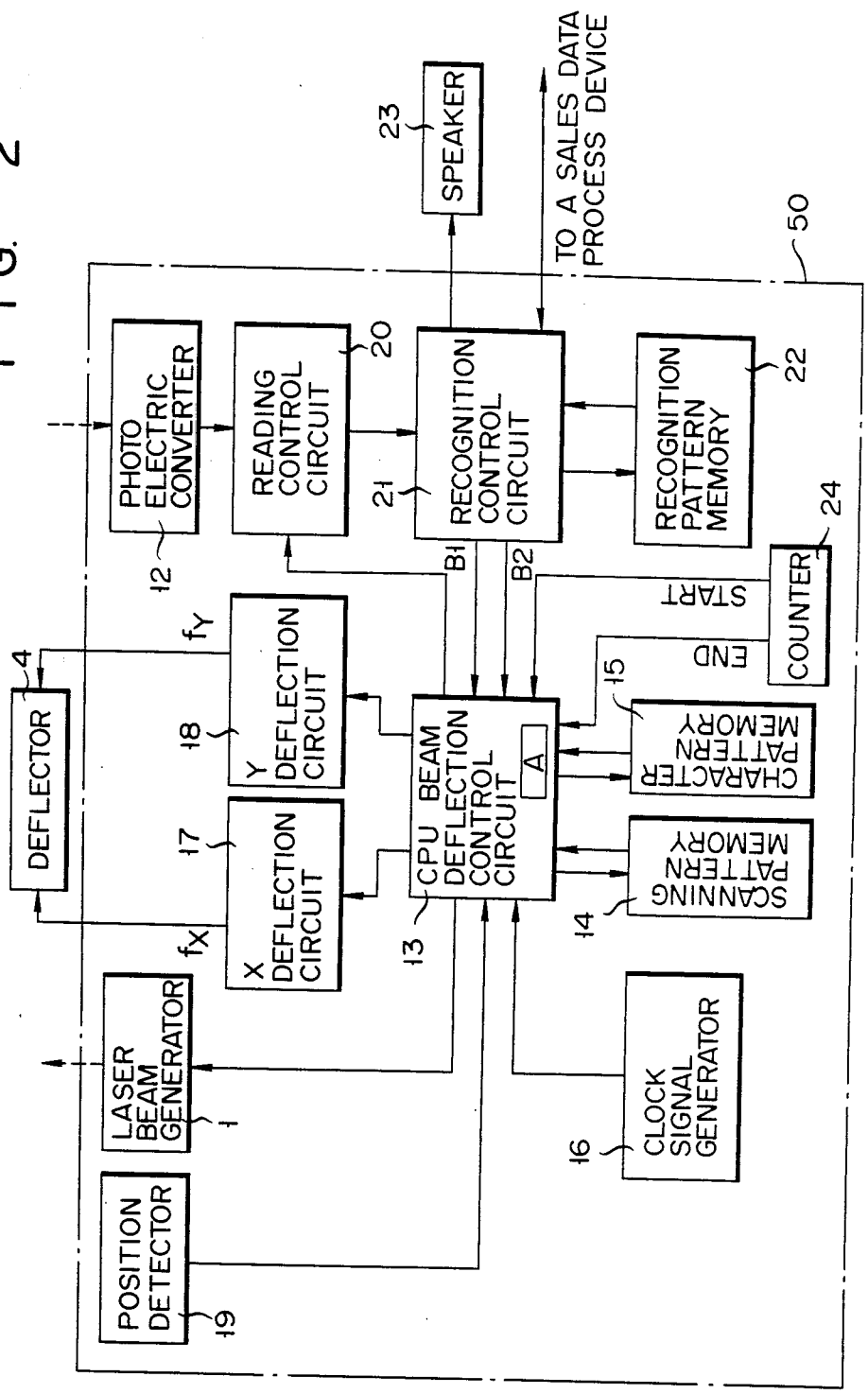
FIG. 2 is a block circuit diagram of the optical reading device.
Figure 3:
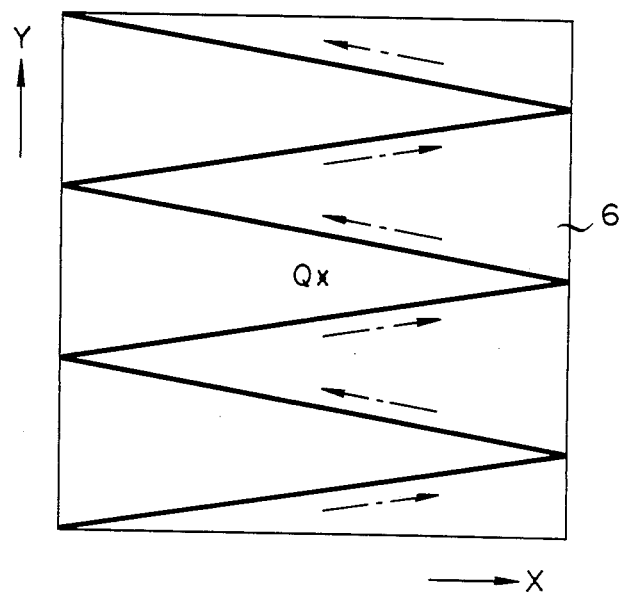
FIG. 3 shows the scanning pattern displayed by the display section of the optical reading device.

A circuit arrangement will be described referring to FIG. 2. Numeral 13 represents a beam-deflection control circuit for controlling the deflector 4. Said control circuit is a CPU (central processing unit). Synchronized with a clock signal supplied from a clock signal generator 16, the beam deflection control circuit 13 supplies a signal, which corresponds to a scan or character pattern read out of a scanning or character pattern memory 14 or 15, to x and y deflection circuits 17 and 18, respectively, thereby causing the x and y deflection circuits 17 and 18 to generate predetermined electrical signals fx and fy. The beam-deflection control circuit 13 also supplies on and off signals to the laser beam generator 1. When the position detector 19 arranged adjacent to the reading window 6 detects an object crossing thereon, the laser beam generator 1 is activated by the beam-deflection control circuit 13. In response to the detection signal supplied from the position detector 19, the beam-deflection control circuit 13 supplies a control signal to a reading control circuit 20 to show that the scanning operation is being performed at the reading window 6. The reading control circuit 20 operates according to the control signal supplied from the beam-deflection control circuit 13 and reads an electrical signal (or zebra code information) which has been conversion-supplied from the photoelectric converter 12. When the zebra code information recorded on one label is read, the reading control circuit 20 supplies the data read out of the one label to a recognition control circuit 21. Recognition of the read data is carried out in the recognition control circuit 21 by comparing the read data with the pattern data retrieved from the recognition pattern memory 22.

The recognition control circuit 21 supplies a sound command to the speaker 23 indicative of whether or not the read data has been recognized. When the read data has been recognized, the recognition control circuit 21 then transfers the data to a sales data process device (not shown) such as the electronic register which receives various kinds of messages such as the good's name from the sales data process means. The recognition control circuit 21 also applies a recognition end signal to the beam deflection control circuit 13 through a bus line B1 after the read data and any associated message, such as the good's name, has passed through another bus line B2. The read data and any associated message, such as the good's name, are stored in a memory allocated for this purpose in this case, in a register A arranged in the beam deflection control circuit 13. The data stored in register A can then be used to address the character pattern memory 15 which contains previously stored instructions for the generation of displays of different characters.

Reading of the character pattern or the like is controlled by the light-deflection control circuit 13 which is responsive to start and end signals applied from a counter 24.

Figure 4:
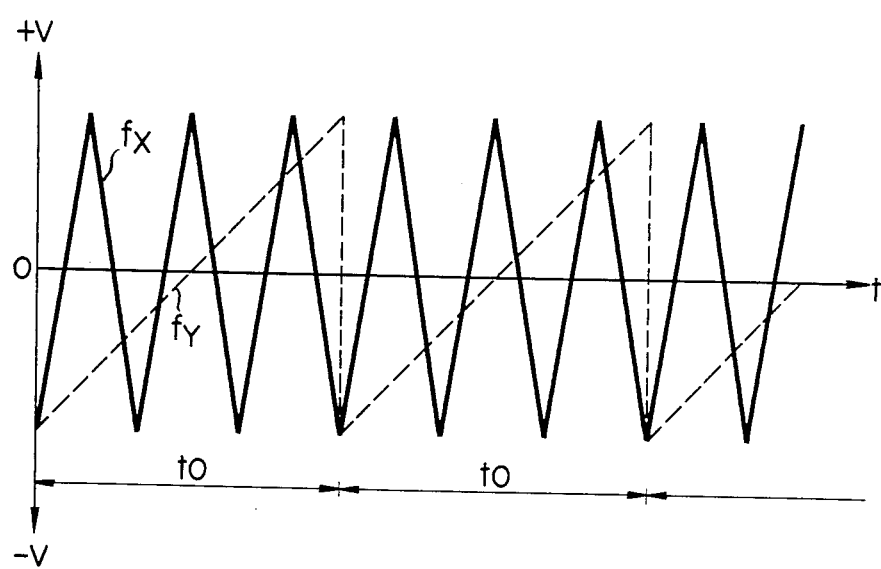
FIG. 4 shows the voltage waveforms of electrical signals fx and fy which are supplied to the light deflector shown in FIG. 1, in order to display the scanning pattern of FIG. 3.

When a matter to be read is detected by the position detector 19, a laser beam from the laser beam generator 1 is caused to irradiate the reading window 6. The beam deflection control circuit 13 reads out the scanning pattern memory 14 to supply signals, which correspond to a scanning pattern, to the x and y beam deflection circuits 17 and 18, respectively, thereby causing the x and y beam deflection circuits 17 and 18 to generate electrical signals fx and fy. As a result, the reading window 6 is beam-irradiated according to the scanning pattern shown in FIG. 3. (The scanning pattern is simplified in FIG. 3 for the sake of clarity as a more complicated scanning pattern is actually used). In order to form the scanning pattern shown in FIG. 3 on the reading window 6, voltage waveform signals, as shown in FIG. 4, are supplied as electrical signals fx and fy. The voltage V is plotted on the ordinate, while the time t is plotted on the abscissa as shown in FIG. 4. The value of the voltage at the point 0 where the abscissa crosses the ordinate is set at zero. When the electrical signals fx and fy have zero voltage, as when they have the scanning pattern shown in FIG. 3, a point Q is irradiated. The right side of the X axis shows when plus voltage is supplied, while the left side thereof shows when minus voltage is supplied. The upper side of the Y axis shows when plus voltage is supplied, while the lower side thereof shows when minus voltage is suppleid. The electrical signals fx and fy shown in the scanning pattern of FIG. 3 have the voltage waveforms shown in FIG. 4. $t_0$ represents the time interval needed to start and end the scanning pattern shown in FIG. 3 which is continuously repeated by every tine interval $T_0$.

Figure 5:
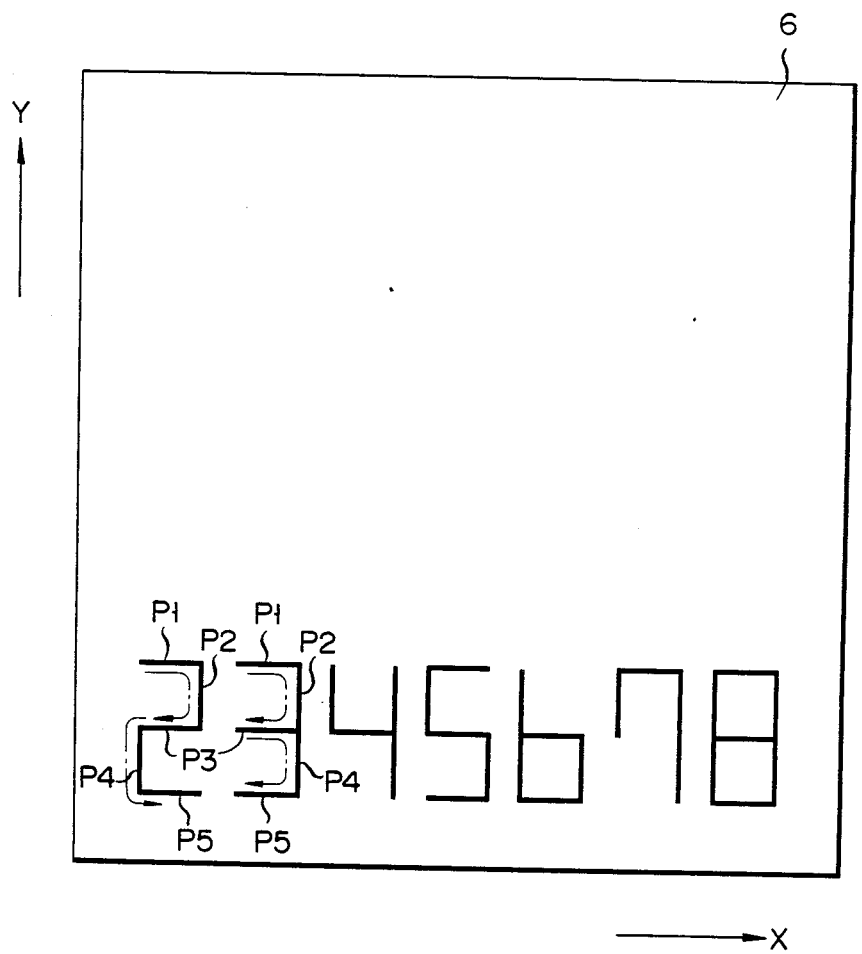
FIG. 5 shows a character pattern which may be displayed by the display section.
Figure 6:
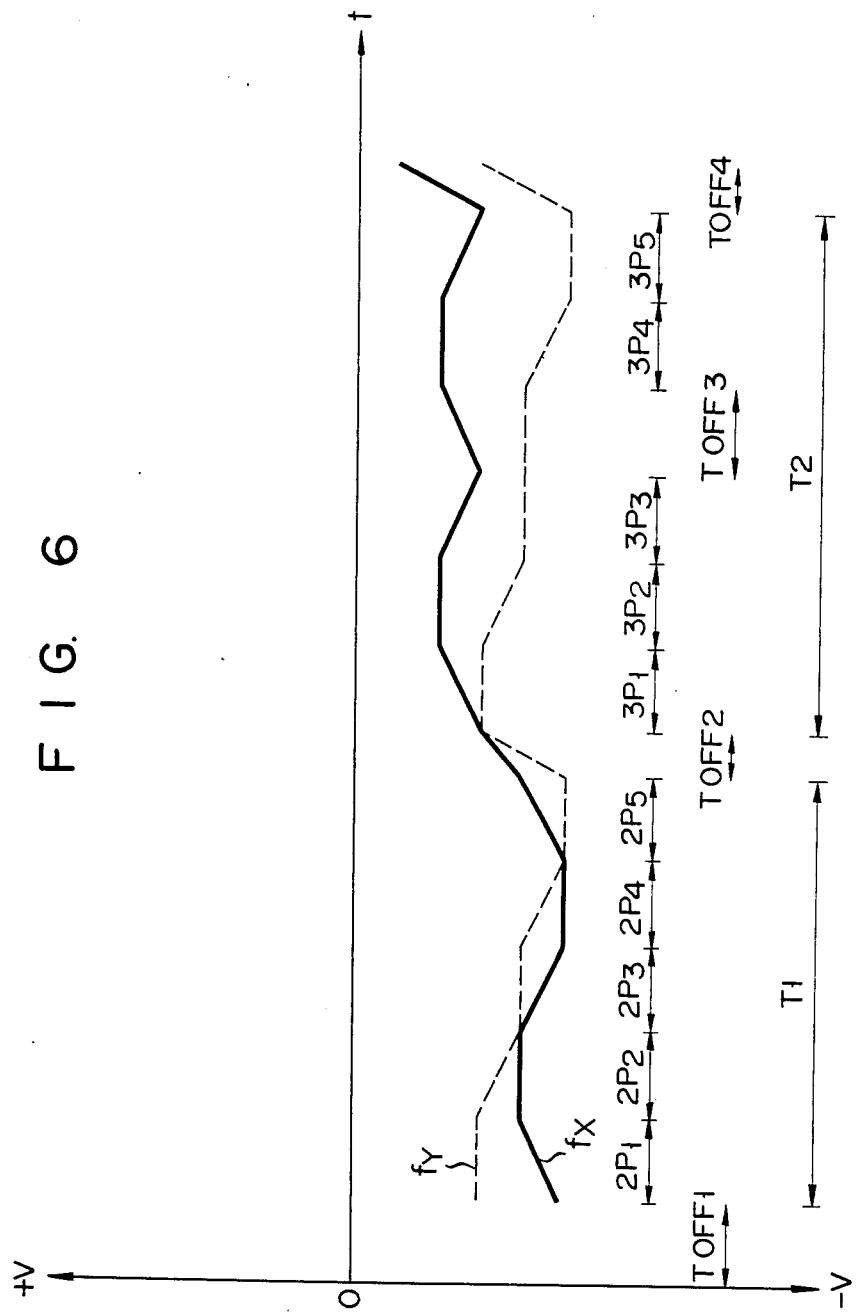
FIG. 6 illustrates the voltage waveforms of electrical signals fx and fy which are supplied to the deflector in order to display the character pattern of FIG. 5.

When the label on the reading window 6 is beam-irradiated according to the scanning pattern, the reflected beam is guided to the photoelectric converter 12 through the optical system, and the zebra code information on the label is read by the reading control circuit 20. The data read in this manner is introduced into the recognition control circuit 21 where it is recognized. Different sounds are produced by the speaker 23 according to the result of this data recognition. When the read data has been recognized, it is sent to the sales data process device and to register A in the beam deflection control circuit 13. The character pattern which corresponds to the read data is read out of the character pattern memory 15 according to the contents of the memory register A. Signals which correspond to the character pattern are applied to the X and Y beam deflection circuits 17 and 18, thereby causing the X and Y beam deflection circuits 17 and 18 to generate the predetermined electrical signals fx and fy. As a result, a character pattern as shown in FIG. 5, for example, is formed on the reading window 6. Namely, when the beam-deflection control circuit 13 receives the recognition end signal applied from the recognition control circuit 21, a character pattern which corresponds to the recognized data is formed on the reading window 6. The electrical signals fx and fy having the voltage waveforms shown in FIG. 6 form this character pattern on the reading window 6. As in FIG. 4, FIG. 6 shows how voltage is plotted on the ordinate, and how time is plotted on the abscissa. T1 denotes the time period during which a numeral "2" is formed; T2 denotes a time period during which a numeral "3" is formed; and $T_{OFF1-4}$ denotes a time period during which the laser beam generator 1 is off. $2P_1-2P_5$ in the time period T1 represents the timings at which the picture elements $P_1-P_5$ of the numeral "2" in the X and Y directions are formed; and $3P_1-3P_5$ in the time period T2 represents the timings at which the picture elements $P_1-P_5$ of the numeral "3" in the X and Y directions are formed. More specifically the initial picture element $P_1$ of "2" is a line drawn from left to right in the X direction, as shown in FIG. 5. Therefore the electrical signal fx becomes high in voltage, while the electrical signal fy becomes constant at the timing $2P_1$. Similarly, the next picture element $P_2$ is a line drawn from the top to the bottom in the Y direction making the electrical signal fx constant in voltage while the electrical signal fy is low at the timing $2P_2$. Accordingly, the electrical signals fx and fy have the necessary voltage waveforms to form the numeral "2" during the time period T1. After that, the laser beam generator 1 is turned off for the time period $T_{OFF2}$, and the electrical signals fx and fy are elevated to the level of the initial picture element $P_1$. The electrical signals fx and fy next have the necessary voltage waveforms to form the numeral "3" during the time period T2. The laser beam generator 1 is turned off during the time period $T_{OFF3}$ after the picture element $P_3$ has been formed to enable the picture element $P_3$ to be duplicated. When the numeral is formed as described above, it becomes visible and is displayed as a readable data on the reading window 6 which is made of semi-transparent material.

When a new matter has been detected by the position detector 19, the laser beam generator 1 is driven, and the character pattern displayed on the reading window 6 is replaced by a scanning pattern.

Figure 7:
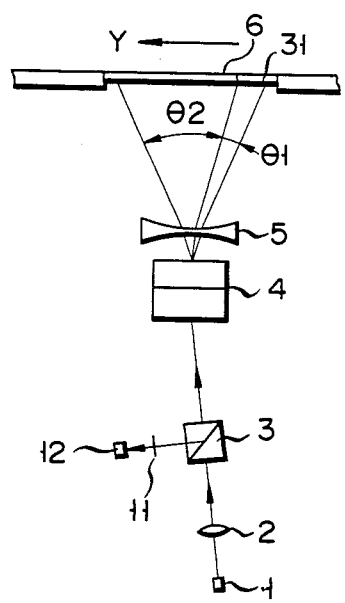
FIG. 7 schematically shows the optical system of another optical reading device according to the presnet invention.

Another embodiment of the present invention will be described referring to FIGS. 7 through 9. The same parts as those in FIGS. 1 through 4 will be represented by the same reference numerals, and a description of these parts will be omitted. This embodiment is different from the first one in that the character pattern is formed not on the reading window 6 but on an exclusive display window 31. Since the display window 31 is independent of the reading window 6, the beam deflection angles of the beam deflector 4 in the Y direction are $\theta_1$ relative to the display window 31, and $\theta_2$ relative to the reading window 6. The reading window 6 in this embodiment is made of a transparent material since it is used exclusively for the scanning patterns, and the display window 31 is made of a semi-transparent material.

Figure 8:
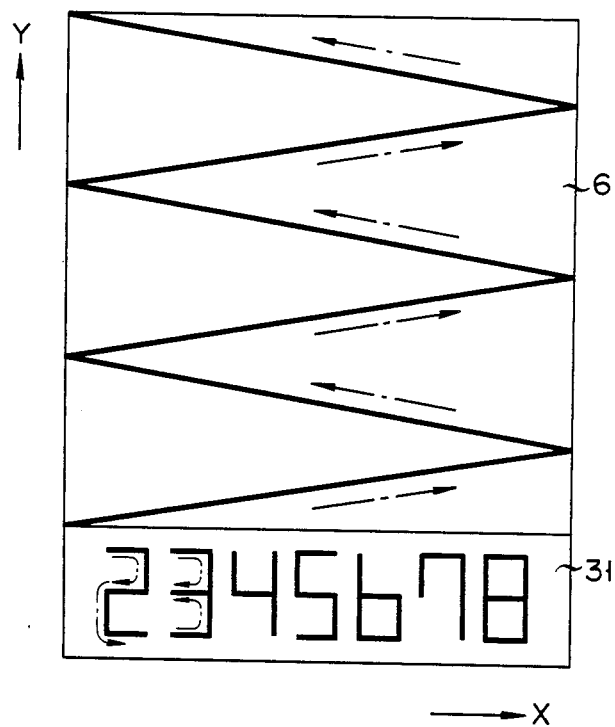
FIG. 8 shows a display section with a character pattern-displaying region, which may be used in the present invention.
Figure 9:
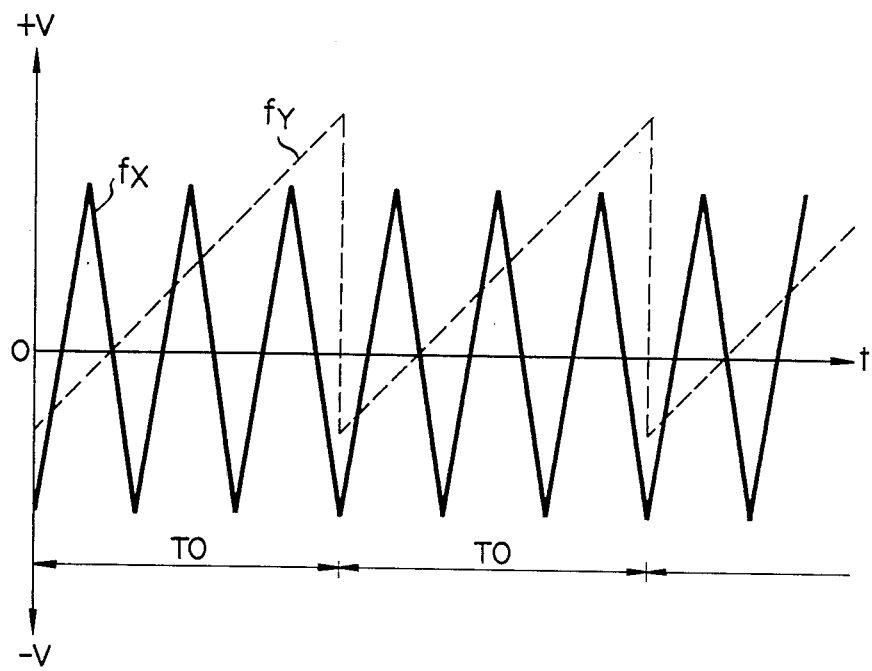
FIG. 9 illustrates the voltage waveforms of electrical signals fx and fy which are supplied to the deflector in order to display the character pattern shown in FIG. 8.

When the display window 31 is formed independently as described above, the electrical signals fx and fy, which form a scanning pattern as shown in FIG. 8 on the reading window 6, have the voltage waveforms shown in FIG. 9. Since the scanning pattern shown in FIG. 8 is similar to the one shown in FIG. 3, the electrical signal fx has same voltage waveform as that of the signal fx in FIG. 4, while the electrical signal fy has a higher voltage waveform which corresponds to the beam deflection angle $\theta_1$, as compared with the signal fy in FIG. 4.

The operation of forming the character pattern shown in FIG. 8 on the reading window 6 is the same as in the first embodiment, and so a description of this operation will be omitted.

Figure 10:
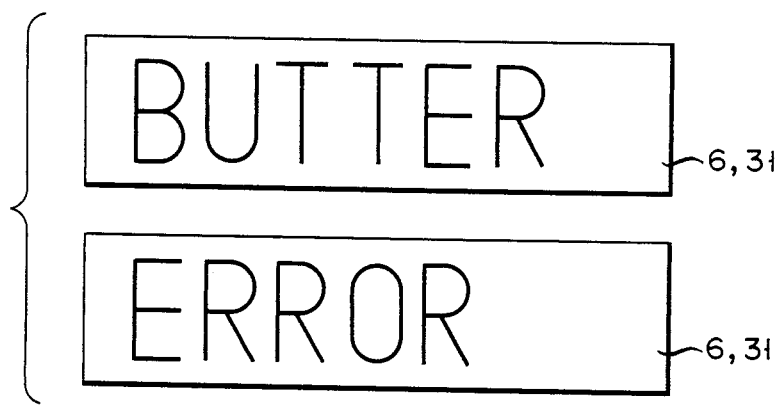
FIG. 10 shows the merchandise name and operator guidance, both displayed by the display section.

FIG. 10 shows the name of the goods to be sold and the operator guidance instructions relating to read data displayed on the reading or display window 6 or 31 of the first or second embodiment. The name of the goods and the operator guidance instructions leave the sales data process means as the read data enters the sales data process means. This received data is displayed as long as no output is applied from the position detector 19 after the character pattern of the read data has been displayed.

Figure 11:
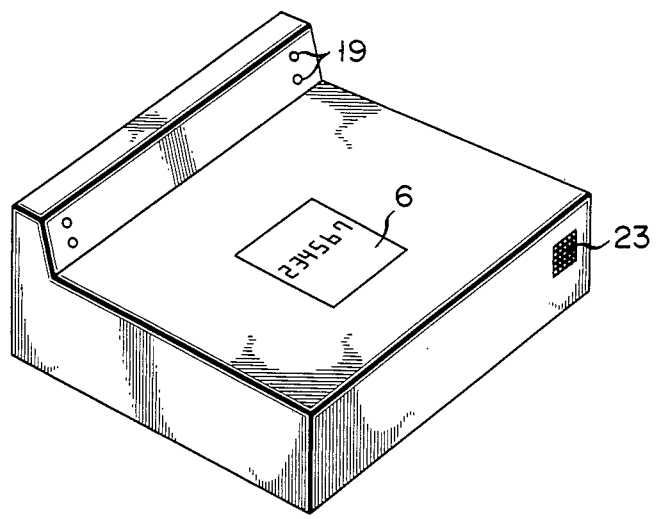
FIG. 11 is a perspective view showing the device in which the displayed data is positioned in the center of the display section.
Figure 12:
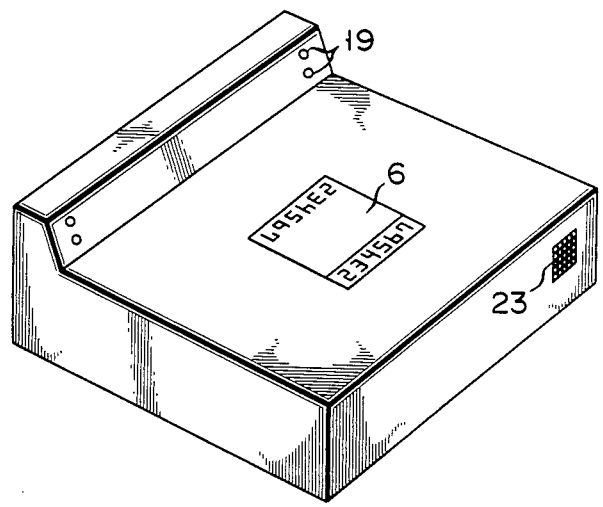
FIG. 12 shows another example of a display section according to the present invention.

FIGS. 11 through 14 show one variation of the present invention. Namely, FIG. 11 shows an example in which data is displayed in the center of the reading window 6 as in the first embodiment. FIG. 12 shows another example in which the same read data is displayed at the upper and lower end portions of the reading window 6, in such a way that the data displayed at the upper end can be read by customers, and the data displayed at the lower end portion thereof can be read by the operator. Accordingly, data can be displayed in various ways on the reading or display windows.

FIG. 13 shows a further example wherein the display window 31 is located away from the reading window 6 and wherein the beam passing through the concave lens 5 is guided to the display window 31 through two reflectors 32 and 33 which are arranged parallel to each other. When the second embodiment is arranged like this, the display window 31 can be slanted to meet the eyes of the operator, as shown in FIG. 13. Beam diffraction elements for holography may be used instead of reflectors.

When reflectors are used, the variation shown in FIG. 13 can be imagined. In the example shown in FIG. 14, the position detector 19 is omitted, and instead a detector window 34 is arranged adjacent to the reading window 6. The detector window 34 is scanned by the same optical system used to scan the reading window 6. However, since the detector window 34 is separated by some distance from the reading window 6, the beam is guided to the detector window 34 by means of reflectors. The display and the detector windows 31 and 34 are scanned side by side. When a matter is detected when the detector window 34 is scanning, the reading window 6 starts to scan. The example shown in FIG. 14 may be varied in such a way that the display window 31 can also perform the function of the detector window 34 so that a detector window 34 need not be provided. If a beam is introduced directly to the detector window 34, the beam may be guided to the reading window 6 by reflectors. Similarly, a beam may be either guided directly to the display window 31 or may be guided indirectly to the display window 31 by reflectors.

Characters which correspond to the read data are displayed after the read data is recognized. When the position detector 19 detects that another matter is about to come near, the characters are no longer displayed in the above-described embodiments. However, the display may be prolonged for a prescribed time period after the read data has been recognized.

Although the beam diffraction elements 7 and 8 are put one upon the other to deflect the beam in the X and Y directions in the above embodiments, more beam diffraction elements may be used to widen the deflection angle of the beam in the X and Y directions. If so, the distance from the light source to the scanning window can shortened, thereby enabling the optical reading device itself to be made smaller.

Although a concave lens 5 is positioned on the output side of the beam deflector to make the deflection angle of the beam wider, any type of lens that can make the deflection angle of the beam wider may be used. A hologram disc which diffracts the beam or a Fresnel lens may be used, for example. Further, the data to be read is not limited to zebra codes, but may be letters, numerals, or other symbols.

It should be understood that the present invention is not limited to the above-described embodiments and that various modifications can be applied without departing from the spirit and scope of the present invention.

What is claimed is:

1. An optical scanning and display apparatus comprising:
   a light source means for generating light;
   a deflection means for deflecting said light from said light source means;
   a deflection control means for generating electrical signals that control the deflection of light by said deflections means, said deflection control means generating during a first time period a first sequence of electrical signals for optical scanning of an object with said light from said light source means and during a second time period a second sequence of electrical signals for scanning said light from said light source means to produce a readable character display;
   a window means for allowing said light deflected by said deflection means to pass therethrough to scan said object to be scanned when said first sequence of electrical signals are supplied to said deflection means from said deflection control means and for allowing the display in readable form of optical characters formed by said light deflected by said deflection means when said second sequence of electrical signals for optical character display are supplied to said deflection means from said deflection control means;
   a conversion means for converting into electrical signals light reflected from said object; and
   means for receiving said electrical signals from said conversion means and recognizing data recorded on said object in accordance with said received electrical signals, and wherein said displayed characters are representative of said recognized data.

2. An optical reading device according to claim 1, wherein the deflection control means includes a scanning pattern memory for storing those data which correspond to scanning patterns of the light deflected by the deflection means, and a character pattern memory for storing those data which correspond to character patterns of the light deflected by the deflection means.

3. An optical reading device according to claim 1, wherein the recognition control means includes a recognition pattern memory where reference pattern data is stored for comparison with the recognized data.

4. An optical scanning and display apparatus according to claim 1 wherein said window means has character display sections at its upper and lower sections, and a central section that is transparent to said deflected light employed for optical scanning, thus allowing said optical scanning to be performed at said central section of said window means.

5. An optical scanning and display apparatus according to claim 1 further comprising a detector means for detecting when said object to be scanned is near said window means and initiating said optical scanning of said object.

6. An optical scanning and display apparatus according to claim 1 wherein said deflection control means further comprises a data processing device coupled to said receiving and recognizing means, said data processing device, in response to the processing of said electrical signals received at said receiving and recognizing means as a result of scanning said object, generating said second sequence of electrical signals for optical character display, thereby displaying characters on said window means which are associated with said scanned object.

7. An optical reading device according to claim 1, wherein the deflection control means includes a counter means for causing the display means to display the character pattern for a certain time period.

8. An optical scanning and display apparatus comprising:
   light source means for generating light;
   deflection means for deflecting said light from said light source means;
   means for generating during a first time period a first sequence of electrical signals that control said deflection means so as to scan said light across an object;
   means for generating during a second time period a second sequence of electrical signals that control said deflection means so as to deflect said light in a pattern of one or more readable characters;
   window means having an optical scanning window for allowing light deflected by said deflection means to pass therethrough to scan said object, when said first sequence of electrical signals are supplied to said deflection means and a character display window for displaying readable optical characters formed by light deflected by said deflection means when said second sequence of electrical signals are supplied to said deflection means;
   means for converting into electrical signals light reflected from said object during scanning; and
   recognition means for receiving said electrical signals from said conversion means and recognizing data recorded on said object in accordance with said received electrical signals, and wherein said displayed characters are representative of said recognized data.

9. An optical scanning and display apparatus according to claim 8 further comprising reflector means for guiding said light, deflected by said deflection means for optical character display, into said character display window.

10. An optical scanning and display apparatus according to claim 8 further comprising a detector means for detecting when said object to be scanned is near said window means and initiating said optical scanning of medium to be scanned.

11. An optical scanning and display apparatus according to claim 8 further comprising means coupled to said recognition means for causing said means for generating a second sequence of electrical signals to generate those signals that produce a display of characters associated with data read by said recognition means from said scanned object.

12. An optical scanning and display apparatus comprising:
   light source means for generating light;
   deflection means for deflecting said light from said light source means;
   means for generating a first sequence of electrical signals that control said deflection means so as to scan said light across an object;

means for generating a second sequence of electrical signals that control said deflection means so as to deflect said light in a pattern of one or more characters;

means for displaying optical characters formed by light deflected by said deflection means when said second sequence of electrical signals are supplied to said deflection means;

means for converting into electrical signals light reflected from said object during scanning;

recognition means for receiving said electrical signals from said conversion means and recognizing data recorded on said object in accordance with said received electrical signals; and display generation means coupled to said recognition means for causing said means for generating a second sequence of electrical signals to generate those signals that produce a display of characters associated with data from said scanned object that is recognized by said recognition means.

13. The device of claim 12 wherein the means for generating a first sequence of electrical signals includes a scanning pattern memory for storing those data which correspond to scanning patterns for scanning the light deflected by the deflection means.

14. The device of claim 12 wherein the means for generating a second sequence of electrical signals includes a character pattern memory for storing those data which generate character patterns in the light deflection by the deflections means.

15. The device of claim 14 wherein the display generation means comprises:

memory means for storing signals received from said recognition means that are associated with data recorded on said object; and means for using the signals stored in said memory means to obtain from said character pattern memory data specifying the generation of character patterns corresponding to the signals stored in said memory means.

* * * * *